United States Patent
Bolen et al.

(10) Patent No.: US 8,205,043 B2
(45) Date of Patent: *Jun. 19, 2012

(54) SINGLE NODENAME CLUSTER SYSTEM FOR FIBRE CHANNEL

(75) Inventors: David Brittain Bolen, Durham, NC (US); John Meneghini, Billerica, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,889

(22) Filed: Nov. 30, 2011

(65) Prior Publication Data
US 2012/0079195 A1    Mar. 29, 2012

Related U.S. Application Data

(63) Continuation of application No. 11/411,502, filed on Apr. 26, 2006, now Pat. No. 8,090,908.

(51) Int. Cl.
*G06F 12/00* (2006.01)
*G06F 21/00* (2006.01)
*G06F 13/00* (2006.01)

(52) U.S. Cl. ............ 711/114; 711/6; 711/111; 711/112; 711/170; 711/202; 711/203

(58) Field of Classification Search .............. 711/6, 111, 711/112, 114, 170, 202, 203; 707/2
See application file for complete search history.

(56) References Cited

U.S. PATENT DOCUMENTS

| | | | |
|---|---|---|---|
| 5,163,131 A | 11/1992 | Row et al. | |
| 5,819,292 A | 10/1998 | Hitz et al. | |
| 6,868,417 B2 | 3/2005 | Kazar et al. | |
| 7,107,385 B2 | 9/2006 | Rajan et al. | |
| 7,260,737 B1 | 8/2007 | Lent et al. | |
| 7,340,639 B1 | 3/2008 | Lee et al. | |
| 7,769,717 B2 | 8/2010 | Federwisch et al. | |
| 7,873,700 B2 | 1/2011 | Pawlowski et al. | |
| 2002/0049883 A1 | 4/2002 | Schneider et al. | |
| 2007/0088702 A1 | 4/2007 | Fridella et al. | |

*Primary Examiner* — Midys Rojas
(74) *Attorney, Agent, or Firm* — Cesari and McKenna, LLP

(57) ABSTRACT

A system and method provides a single system image for a clustered storage network including techniques for processing data access commands between storage appliances over the cluster interconnect. The system is configured such that the cluster is assigned a single world wide nodename. Requests coming to the cluster from client initiators are directed to one or the storage appliances in the cluster, i.e. the "receiving" storage appliance. Commands received by the receiving storage appliance are examined to determine LUN value(s) in the request. If the LUN value is associated with a local storage device, the request is processed by the receiving storage appliance. If the LUN value is not associated with the receiving storage appliance, the request is conveyed over the cluster interconnect to the partner storage appliance to be processed and the appropriate data written or retrieved.

24 Claims, 14 Drawing Sheets

| VLUN | PLUN |
|------|------|
| 0 | 4096 |
| 1 | 5000 |
| ⋮ | ⋮ |

FIG. 5

SINGLE NODENAME CLUSTER SYSTEM FOR FIBRE CHANNEL

CROSS-REFERENCE TO RELATED APPLICATIONS

The present application is a continuation of commonly assigned application Ser. No. 11/411,502, now U.S. Pat. No. 8,090,908, which was filed on Apr. 26, 2006, and issued on Jan. 3, 2012, by David Brittain Bolen et al. for a SINGLE NODENAME CLUSTER SYSTEM FOR FIBRE CHANNEL and is hereby incorporated by reference.

BACKGROUND OF THE INVENTION

1. Field of the Invention

The present invention relates to networked file servers and more particularly to a Fibre Channel protocol communications mode for a clustered storage system.

2. Background Information

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages access to information in terms of block addressing on disks using, e.g., a logical unit number (LUN) in accordance with one or more block-based protocols, such as FCP.

One example of a SAN arrangement, including a multi-protocol storage appliance suitable for use in the SAN, is described in United States Patent Application Publication No. US2004/0030668 A1, filed on Feb. 14, 2004, entitled MULTI-PROTOCOL STORAGE APPLIANCE THAT PROVIDES INTEGRATED SUPPORT FOR FILE AND BLOCK ACCESS PROTOCOLS by Brian Pawlowski et al., now issued as U.S. Pat. No. 7,873,700 on Jan. 18, 2011, which is incorporated herein by reference in its entirety.

It is advantageous for the services and data provided by a storage system, such as a storage appliance, to be available for access to the greatest degree possible. Accordingly, some storage systems provide a plurality of storage appliances organized as a cluster, with a property that when a first storage appliance fails, the second storage appliance is available to take over and provide the services and the data otherwise provided by the first storage appliance. When the first storage appliance fails, the second storage appliance in the cluster (the "partner") assumes the tasks of processing and handling any data access requests normally processed by the first storage appliance. One such example of a storage appliance cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al., now issued as U.S. Pat. No. 7,260,737 on Aug. 21, 2007, the contents of which are hereby incorporated by reference. In such a storage appliance cluster, an administrator may desire to take one of the storage appliances offline for a variety of reasons including, for example, to upgrade hardware, etc. In such situations, it may be advantageous to perform a "voluntary" user-initiated takeover operation, as opposed to a failover operation. After the takeover operation is complete, the storage appliance's data is serviced by its partner until a giveback operation is performed.

In certain known storage appliance cluster implementations, the transport medium is FC cabling utilizing the FCP protocol (SCSI embedded in FC) for transporting data. FIG. 1A is a schematic block diagram of a prior art storage appliance cluster environment 10. A client 12 is coupled to each of two Fibre Channel switches, 14 and 16. The client issues data access requests to storage appliance A (20) and B (22). In known failover techniques involving clusters of storage appliances, each storage appliance in the cluster maintains two physical FC ports, namely an A port and a B port. A direct coupling to each physical port (which may or may not be representative of one or more virtual ports), is required such as the coupling 26 between switch 14 and port A and the coupling 28 between switch 14 and port B of storage appliance A. For failover purposes, switch 14 is further configured so that it is directly connected to the ports A and B of storage appliance B via the couplings 30, 32, respectively. Thus, switch 14 can provide data access to storage appliance B for the client 12 should the switch 16 become unavailable. The A port is typically active and, as such, is utilized for processing and handling data access requests directed to the storage appliance, while the B port is typically inactive and operates in a standby mode. However, when a failover situation occurs, the B port is activated and assumes the identity of the failed partner storage appliance. At that point, the B port receives and handles data access requests directed to the failed storage appliance. Specifically, if switch 14 fails or storage appliance A fails, for example, there is a transfer of volumes over to storage appliance B in that those volumes can thus be accessed through switch 16 through the direct couplings 34 and 36 to ports A and B, respectively of storage appliance A. Switch 16 continues to access storage appliance B through its own direct couplings 38 and 40 to storage appliance B. In this way, the surviving storage appliance may process requests directed to both the storage appliance and its failed partner storage appliance. Such a conventional FC failover is further described in the above-incorporated patent application entitled SYSTEM AND METHOD FOR TRANSPORT-LEVEL FAILOVER OF FCP DEVICES IN A CLUSTER.

A noted disadvantage of such failover configurations is the requirement for a second (or B) physical port on the storage appliance, which necessitates that an additional port be located on any switch or other routing hardware connecting the storage appliance to the FC network. In such configurations, the B port typically operates in a standby mode for the vast majority of time, e.g., at all times except during a failover; accordingly, the requirement for a second physical port ("port burn") not only increases the costs of the appliance and its associated routing hardware, but also increases the costs for a system administrator to establish and maintain such a clustered storage appliance configuration. In a partner mode of clustering, the "B" port may be used to send information to its partner storage appliance over a cluster interconnect, which is typically an InfiniBand® communications path, or may be an ethernet, servenet, VI/Fibre Channel or an IB communications path. However, these modes still require that the B port remain idle until a failover or take over occurs. A mixed mode which sets up a Fibre Channel loop upon a failover has been proposed but this may not be compatible with all vendors' platforms and may require special firmware. In effect, the clustered storage appliance failover configuration requires twice as many physical ports on the storage appliances and switches as are normally needed.

Additionally, in a cluster failover situation, the Fibre Channel messaging can be difficult. For example, unlike Ethernet, where multiple addresses can be given to the same card, Fibre Channel adapters have one name and one name only so that one can not assign a new name to the Fibre Channel adapter that was associated with a "dead" port and then use that name for communications with a "working port". In other words, a Fibre Channel adapter is needed for each port (the active A port, and the standby B port) for each storage appliance in the cluster, and a new path must be established to handle data access requests in failover mode. This can expensive because Fibre Channel devices can be expensive.

There remains a need, therefore, for a system that includes a clustering technique that does not require dedicated standby ports such that there is a utilization of all ports for processing data access requests throughout the system, and which also avoids the use of a loop mode upon failover.

SUMMARY OF THE INVENTION

The disadvantages of prior techniques are overcome by the present invention which provides a single nodename cluster system in which a multiple storage appliance cluster is configured with a single worldwide node name such that the entire cluster appears to a client as one storage appliance. The single nodename cluster system is illustratively implemented through communications between the multiple storage appliances over a cluster interconnect and a Fibre Channel Protocol (FCP) enhancement mode in accordance with the present invention.

In order to create the appearance of one storage appliance, in accordance with the invention, when logical unit number identifiers (LUN IDs) are assigned, they are used for only one of the storage appliances in the cluster. Specifically, this assigned LUN identifiers (IDs) is thereafter used only by that storage appliance. In this way, when the client (i.e., initiator) sends data access requests to the cluster (as identified by the single worldwide node name), each request is received by one of the storage appliances, i.e. the "receiving storage appliance," in the cluster. The request is examined to determine the particular LUN ID that is requested by that initiator. If the requested LUN is locally owned by the receiving storage appliance, that appliance services the request. If the receiving storage appliance does not locally own that LUN, a forwarding decision is made at the receiving storage appliance to send the request across the cluster interconnect to the partner storage appliance. If the partner storage appliance locally owns that LUN, the partner storage appliance processes the request. If the partner storage appliance does not locally own that LUN, a "NO SUCH DEVICE" error message is returned.

Accordingly, the initiator has access to all of the LUNs served by the cluster, without needing to separately access or address each storage appliance in the cluster. Notably, the forwarding decision is rendered within the cluster without involvement of the initiator.

Upon failure of a storage appliance and subsequent initiation of a failover, the LUNs are still accessible through the surviving storage appliance, which simply checks the requested LUN ID against its own locally owned LUNs. To the extent the requested LUN is not locally owned, the surviving storage appliance may access the LUN from the LUN space of the cluster either through a direct coupling to the disks, or across the cluster interconnect, depending upon the system configuration and reason for the failover. Thus, no standby ports are required, and there is not a need to enter a loop mode.

Subsequent mapping of new LUNs to initiators across the storage appliances of the cluster is also coordinated. More specifically, assume the first storage appliance configures a new LUN for initiator X. The first storage appliance obtains a list of initiator X's LUNs from the second storage appliance and checks it against its list of locally owned LUNs for initiator X. The first storage appliance then assigns a first free LUN ID to the new LUN from the LUN space. This newly assigned LUN ID is communicated over the cluster interconnect to the second storage appliance using a unique cluster protocol and command line interface set within the associated FCP enhancement mode for implementing the single nodename clustering in accordance with the invention. In a further embodiment of the invention, each storage appliance has its own LUN map table which lists what LUNs the partner has mapped, so that each storage appliance has this information without having to send queries back and forth to the partner storage appliance. Each table is periodically updated.

Advantageously, the present invention utilizes all of the ports in the system with no wasted standby ports, or dedicated partner ports. Moreover, the invention is compatible with most vendors' basic hardware and software implementations.

BRIEF DESCRIPTION OF THE DRAWINGS

The above and further advantages of the present invention may be understood by referring to the following description in conjunction with the accompanying drawings in which like reference numerals indicate identical or functionally similar elements:

FIG. 5 is a schematic block diagram of an exemplary LUN map in accordance with an illustrative embodiment of the invention;

DETAILED DESCRIPTION OF AN ILLUSTRATIVE EMBODIMENT

A. Cluster Storage Environment

Figure 1A:
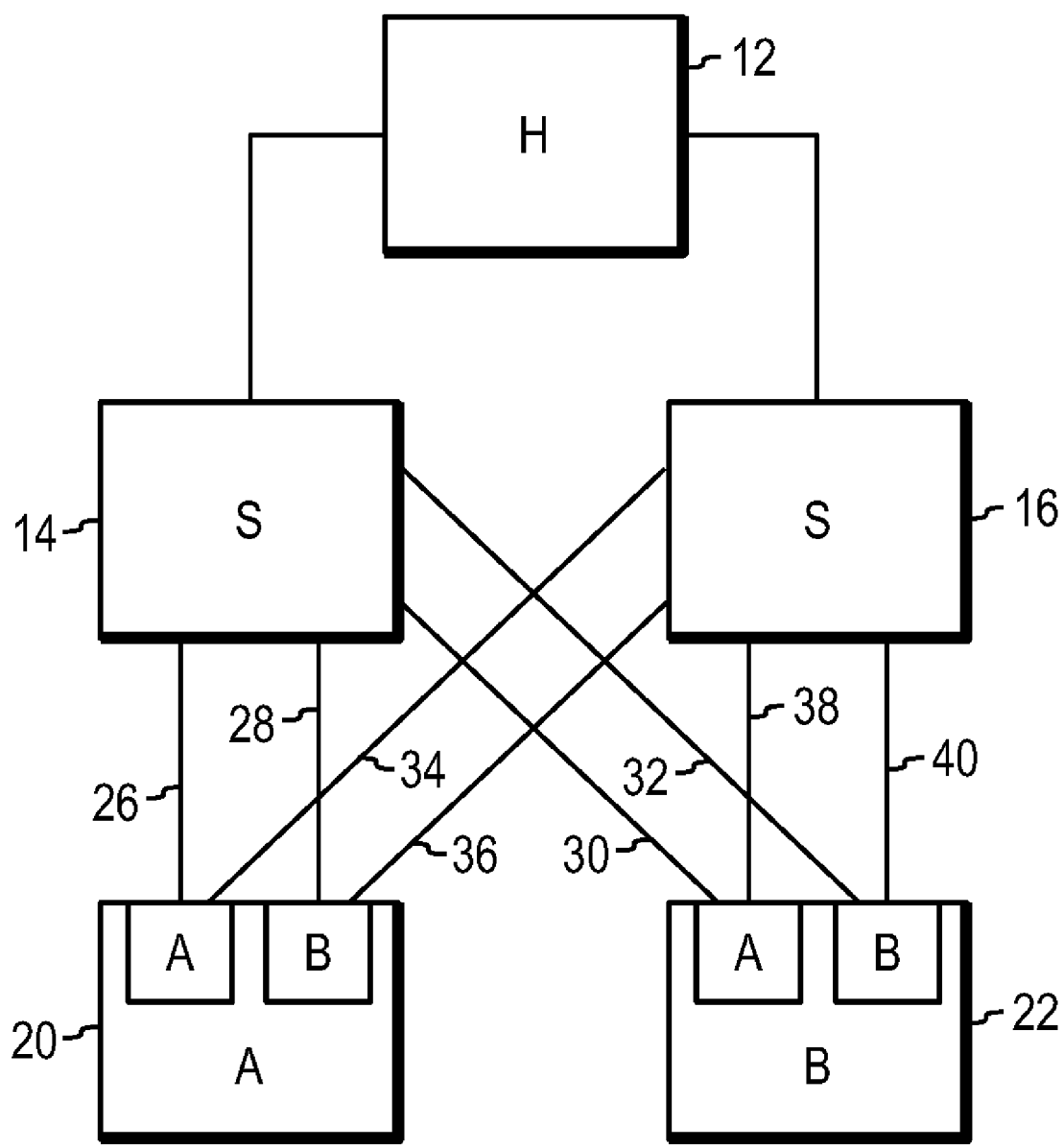
FIG. 1A is a schematic block diagram of a prior art storage system cluster environment.
Figure 1B:
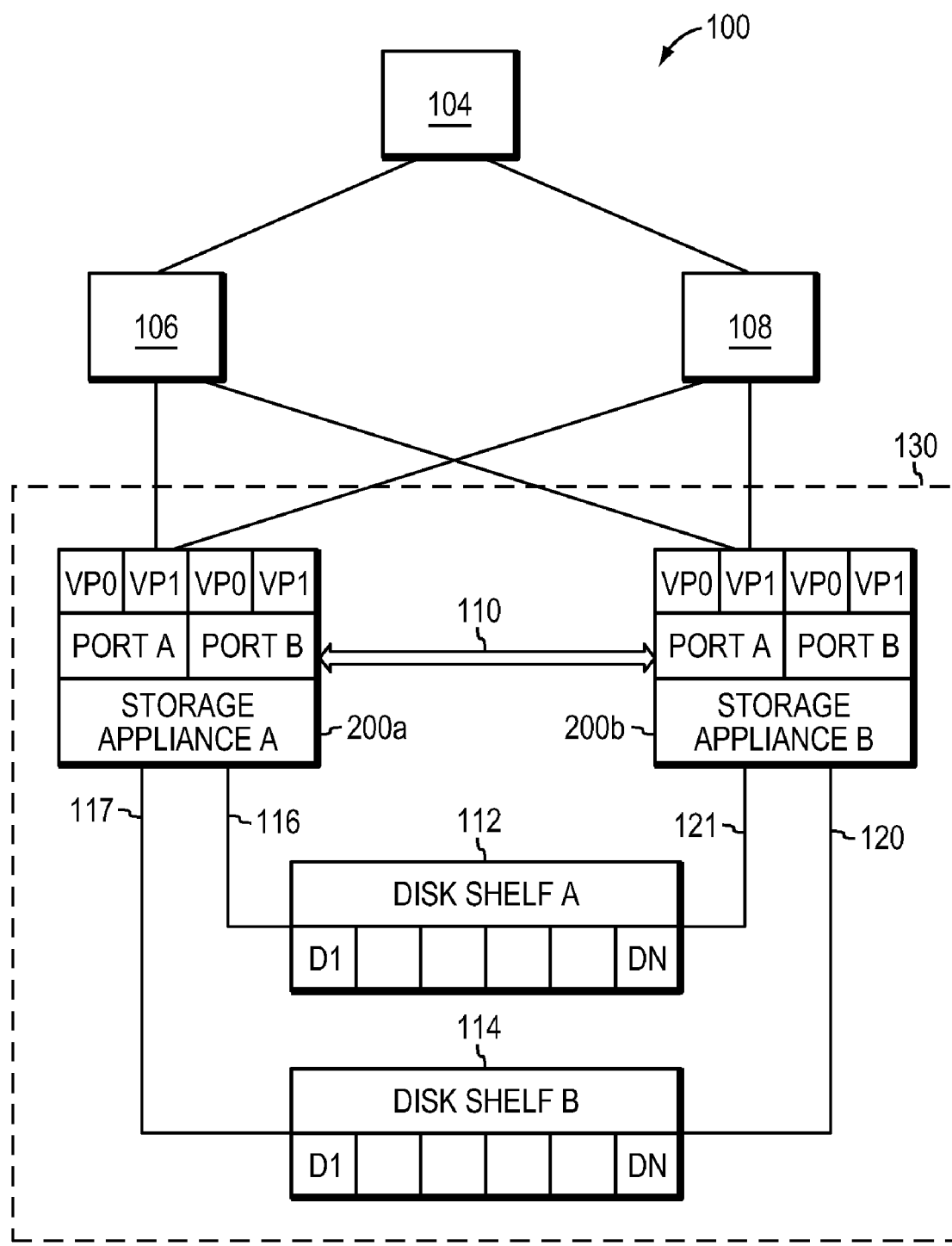
FIG. 1B is a schematic block diagram of an illustrative storage system cluster environment in accordance with an illustrative embodiment of the present invention.

FIG. 1B is a schematic block diagram of an illustrative storage appliance cluster environment 100 in which the principles of the present invention are implemented. A storage appliance is a type of filer, such that as used herein, the term "filer" shall include a (multiprotocol) storage appliance. The term "storage system" is also used herein inter-changeably with "filer" and "multiprotocol storage appliance." The network 100 includes client 104, which is interconnected with conventional Fibre Channel (FC) switches 106 and 108. The switches 106 and 108 are interconnected with storage appliance 200a and storage appliance 200b to form a clustered storage appliance environment configuration 130. Each storage appliance 200a,b is shown with a plurality of ports A and B connected to the switches 106 and 108. It should be noted that the ports A and B may comprise virtual ports, physical ports or a combination thereof. It should further be noted that while only two ports are shown for each storage appliance, in alternate embodiments of the present invention any number of ports may be utilized in accordance with the specific requirements of the cluster configuration. Each switch 106, 108 may be connected to each storage appliance for redundancy. However as will become apparent, the switches 106, 108 are configured to access the other storage appliance across a Fibre Channel cluster interconnect 110.

The client 104 may be a general-purpose computer, such as a PC or a workstation, or a special-purpose computer, such as an application server, configured to execute applications over an operating system that includes block access protocols. When issuing requests for data to the cluster 130, the client is sometimes referred to herein as an "initiator" particularly when the request is a SCSI request. The data requests are received by the appliances configured in accordance with the invention to control storage of and access to interconnected storage devices, such as disks residing on disk shelves 112 and 114.

In the illustrated example, storage appliance 200a is connected to disk shelf 112 by a data access loop 116. It should be noted that such a data access loop can be any acceptable networking media including, for example, a Fibre Channel Arbitrated Loop (FC-AL). Likewise, storage appliance 200b accesses disk shelf 114 via data access loop 120. In accordance with the invention, and as described further herein, storage appliance 200a can also access disk shelf B 114 via a cluster interconnect 110, which provides a direct communication link between the two storage appliances. The cluster interconnect is illustratively a FC data link communication medium. Thus each disk shelf in the cluster is accessible to each storage appliance over the cluster interconnect. It should be noted that disk shelves 112 and 114 are shown directly connected to the storage appliances 200a,b for illustrative purposes only. The disk shelves and storage appliances may be operatively interconnected in any suitable FC switching network topology. For redundancy, storage appliance 200a may also be directly coupled to disk shelf 114 with data access loop 117, and storage appliance 200b can be directly coupled to disk shelf 112 over data access loop 121, if desired in a particular application of the invention.

During normal cluster operation, the storage appliance that is connected to a disk shelf via the disk shelf's primary loop is the "owner" of the disk shelf and the LUNs stored on those locally owned disk shelves. Each storage appliance is primarily responsible for servicing data requests directed to blocks on volumes contained on its disk shelf. Thus, in this example, the storage appliance 200a owns the disk shelf A 112 and is primarily responsible for servicing data access requests for blocks contained on that disk shelf. Similarly, the storage appliance 200b is primarily responsible for the disk shelf B 114. The storage appliance cluster 130 is configured as described herein such that each storage appliance 200 is configured to take over and assume data handling capabilities for the other disk shelf in the cluster 130, e.g., in the event of a failure of the other ("partner") storage appliance.

B. Storage Appliance

Figure 2:
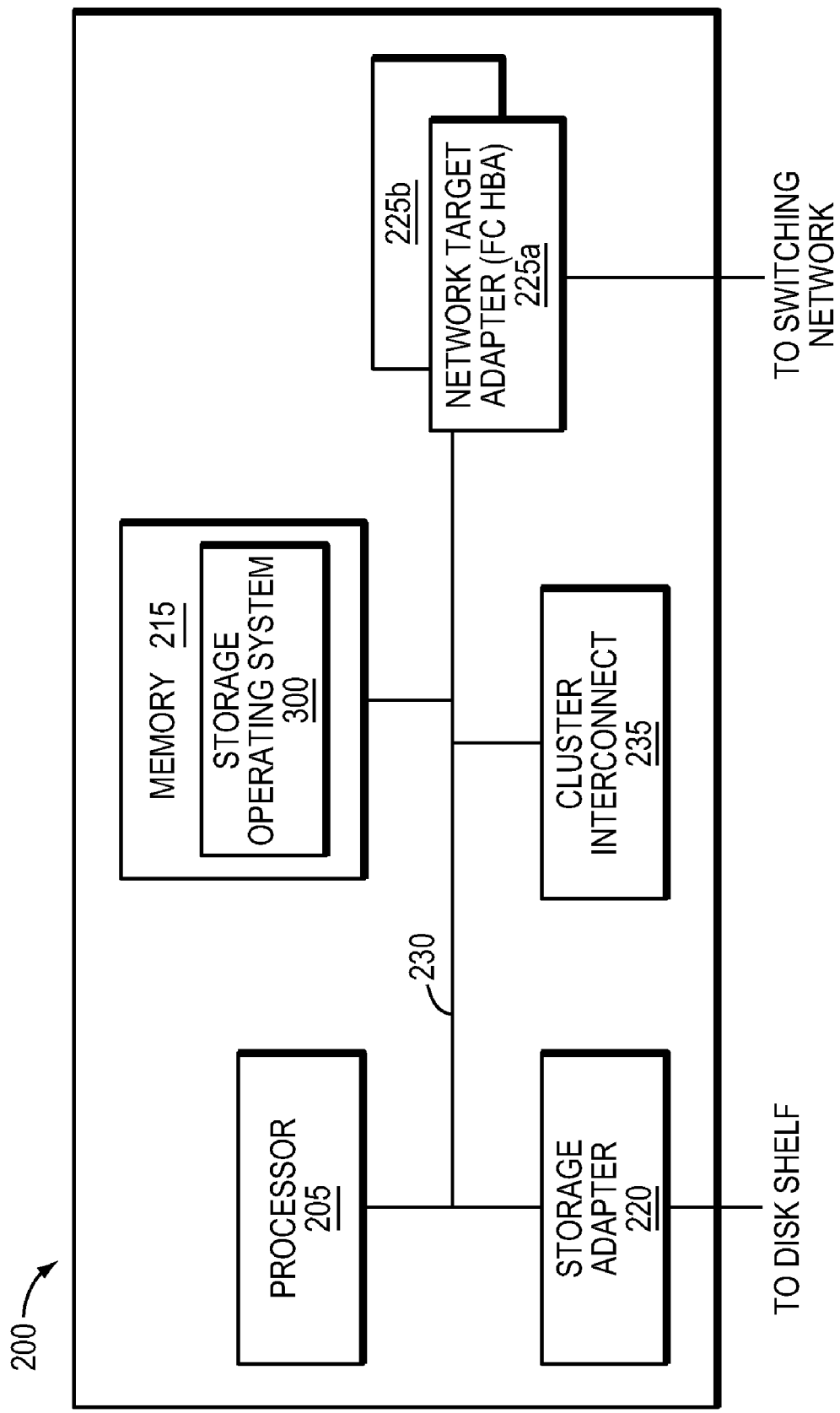
FIG. 2 is a schematic block diagram of an exemplary storage appliance in accordance with an embodiment of the present invention.

FIG. 2 is a schematic block diagram of an exemplary storage appliance 200 (such as storage appliance 200a and storage appliance 200b, FIG. 1B) as used in the clustered network environment 100 configured to provide storage service relating to the organization of information (LUNs) on storage devices, such as disks, in accordance with the present invention. The storage appliance 200 illustratively comprises a processor 205, a memory 215, a plurality of network adapters 225a, 225b and a storage adapter 220 inter-connected by a system bus 230. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (LUN) emulation. An example of such a storage appliance is further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. As noted, the terms "storage system" and "storage appliance" are used interchangeably. The storage appliance 200 also includes a storage operating system 300 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of LUNs or vdisk objects. As described further herein, as LUNs are assigned, the particular LUN ID assigned is thereafter used by only one storage appliance in the cluster.

A vdisk object (hereinafter "vdisk") is a special file type that is implemented by the virtualization system and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 12, 2006, which is incorporated by reference herein in its entirety. The storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 225a, b also couple the storage appliance 200 to clients 104 that may be further configured to access the stored information as blocks or disks. For this SAN-based network environment, the storage appliance is coupled to an illustrative Fibre Channel (FC) switch 106, 108. (FIG. 1B) The network adapters 225 may comprise a FC host bus adapter (HBA) having the mechanical, electrical and signaling circuitry needed to connect the storage appliance 200 to the switch 106, 108. In addition to providing FC access, the FC HBA may offload Fibre Channel network processing operations from the storage appliance's processor 205.

The clients 104 may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol.

In accordance with the basic FC protocol, initiators and targets have three unique identifiers, a Node Name, a Port Name and a Device Identifier. The Node Name and Port Name are worldwide unique, e.g., WWNN and WWPN. A Device Identifier is unique within a given FC switching fabric and is assigned dynamically to the FC port by the FC switch 106, 108 coupled thereto. As described further below, the FC HBAs 225a, b may include support for virtual ports associated with each physical FC port. Typically, each virtual port may have its own unique network address, comprising a WWPN and WWNN. However, in accordance with the present invention, the entire cluster is assigned a single worldwide node name, and thus the entire cluster is the target.

The appliance 200 supports various SCSI-based protocols used in SAN deployments, including SCSI encapsulated over TCP (iSCSI) and SCSI encapsulated over FC (FCP). In an illustrative embodiment of the invention, the initiators (hereinafter clients 104) request the services of the target by issuing FCP messages via the switches 106, 108 and in turn over the cluster interconnect 110, to access information stored on the disks. It will be apparent to those skilled in the art that the clients may also request the services of the clustered storage appliances using other block access protocols. By supporting a plurality of block access protocols, the clustered appliances provide a unified and coherent access solution to vdisks/LUNs in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow LUNs and exports to persist over, e.g., reboot operations, while also enabling management of the vdisk as a single disk object in relation to SAN clients.

A cluster interconnect adapter 235 of the storage appliance 200 is coupled to cluster interconnect 110 to provide communication pathway between storage appliances organized as a storage appliance cluster 130. (FIG. 1B). The storage appliances exchange various types of information over the cluster interconnect 110. In accordance with the invention, and as described further herein, an FC protocol (FCP) enhancement mode allows the storage appliances to process data access requests and proxied data access requests over the cluster interconnect 110. Other information, such as a heartbeat signal, is also conveyed across the cluster interconnect 110. Configurations where data access commands are proxied across the cluster interconnect 110 are further described in commonly-owned United States patent application of Lee et al., entitled SYSTEM AND METHOD FOR PROXYING DATA ACCESS COMMANDS IN A CLUSTER SYSTEM, U.S. patent application Ser. No. 10/811,095, filed on Mar. 26, 2004, now issued as U.S. Pat. No. 7,340,639 on Mar. 4, 2008, which is incorporated herein in its entirety.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP® operating system that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 3:
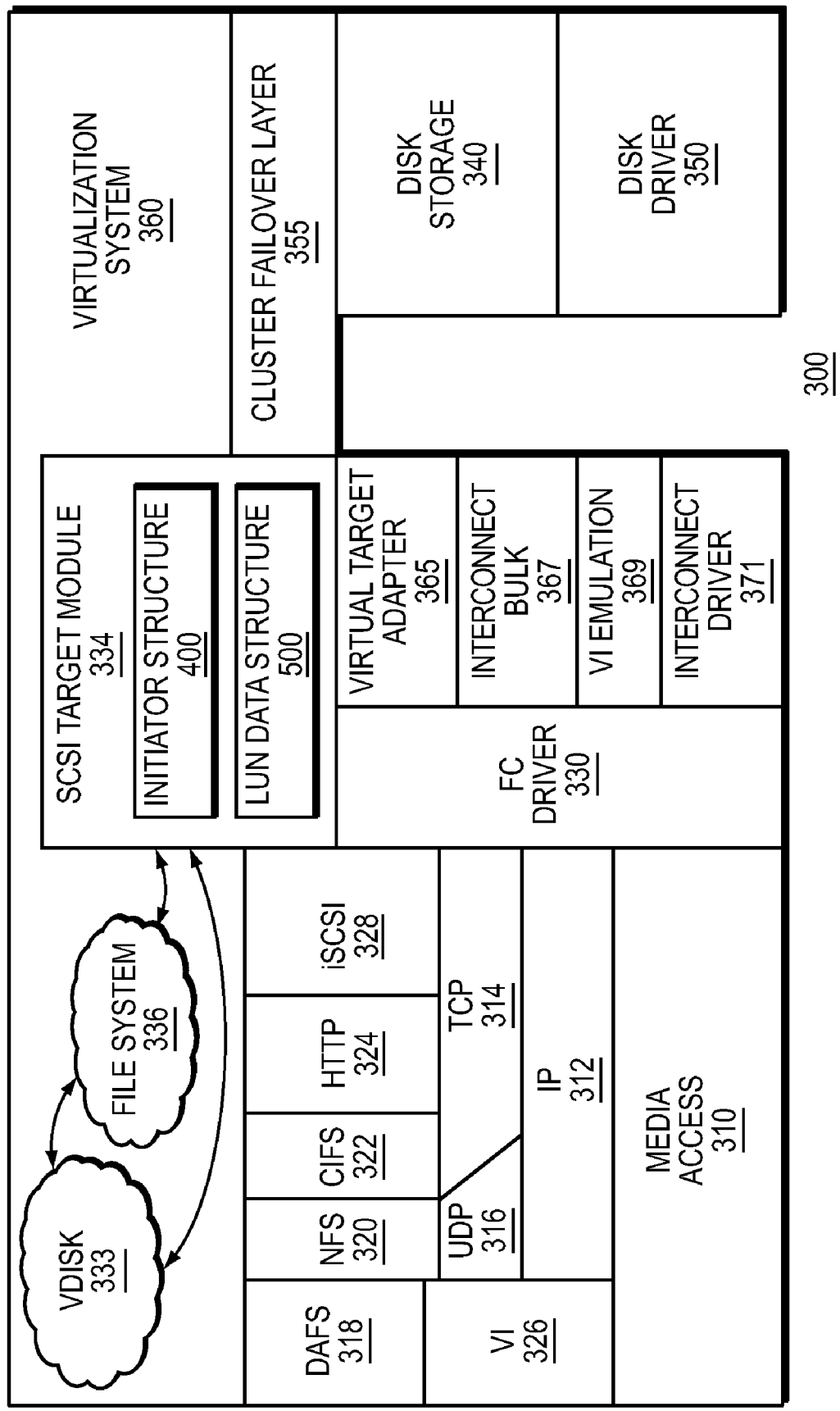
FIG. 3 is a schematic block diagram of an exemplary storage operating system for use with the exemplary storage appliances of FIG. 2 in accordance with an exemplary embodiment of the present invention.

FIG. 3 is a schematic block diagram of an exemplary storage operating system 300 for use with the exemplary storage appliances that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the LUNs (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target module 334. The vdisk module and SCSI target module may be implemented in software, hardware, firmware or a combination thereof. The vdisk module 333 manages SAN deployments by, among other things, implementing a comprehensive set of vdisk (LUN) commands that are converted to primitive file system operations ("primitives") that interact with the file system 336 and the SCSI target module 334 to implement the vdisks.

The SCSI target module 334, in turn, initiates emulation of a disk or LUN by providing a mapping procedure that translates LUNs into the special vdisk file types. The SCSI target module is illustratively disposed between the FC and iSCSI drivers 328, 330 and the file system 336 to thereby provide a translation layer of the virtualization system 360 between the SAN block (LUN) space and the file system space, where LUNs are represented as vdisks. By "disposing" SAN virtualization over the file system 336, the multi-protocol storage appliance reverses the approaches taken by prior systems to thereby provide a single unified storage platform for essentially all storage access protocols.

The SCSI target module 334 also implements, in the illustrative embodiment, the novel LUN ID assignment technique of the present invention, described further herein. To that end, the SCSI target module 334 includes a set of initiator data structures 400 and a set of LUN data structures 500. These data structures, described further below, store various configuration and tracking data utilized by the storage operating system for use with each initiator (client) and LUN (vdisk) associated with the storage system.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

A cluster failover (CFO) layer 355 of the storage operating system 300 implements various failover features including initiating a failover. Illustratively, the CFO layer 355 monitors the cluster interconnect 110 for heartbeat signals that alert the other storage appliance in the cluster that the "partner" storage appliance is operational.

The storage operating system 300 also includes a virtual target adapter 365 and cluster interconnect 110. The virtual target adapter 365 is disposed over an interconnect communication stack that includes an interconnect bulk 367, a VI emulation layer 369 and an interconnect driver layer 371. The virtual target adapter 365 provides a software interface to the SCSI target 371. The interconnect bulk module 367 provides flow control over the cluster interconnect 110 for proxying services. VI emulation layer 369 implements the appropriate RDMA functionality of a VI protocol over the interconnect driver 371, which directly interfaces with the cluster interconnect adapter 235 to provide data access transmissions over the cluster interconnect 110.

In accordance with the illustrative embodiment, the FC driver 330 passes received SCSI commands to the SCSI target module 334 through a common API. The SCSI target module 334 examines the LUN requested, and if the request is for a LUN "owned" by the receiving storage appliance ("a local LUN"), the SCSI target module 334 continues to process the request locally. If the command is for a LUN not owned by the receiving storage appliance, it is thus proxied to the partner storage appliance ("a proxy LUN"). In such a case, SCSI target module 334 passes the command to the virtual target adapter 365 for processing. Thus, the SCSI target 334 renders this forwarding decision based upon the LUN requested in the command that is received. It should be noted that in alternate embodiments, the forwarding decision may be based upon other factors, including, for example, the network address of the initiator.

As noted, the cluster in the FC network has a unique World Wide Node Name (WWNN) that illustratively is a 64-bit value. Each FC device in the cluster also has one or more associated ports, each of which has a unique World Wide Port Name (WWPN) that is illustratively a 64-bit value. However, the present invention permits clients of the storage appliances in the cluster to request access to data serviced by the cluster without regard to which storage appliance locally owns the data and which ports may be available. The data access requests and forwarding decisions are handled within the cluster and are not apparent to the client.

Figure 4:
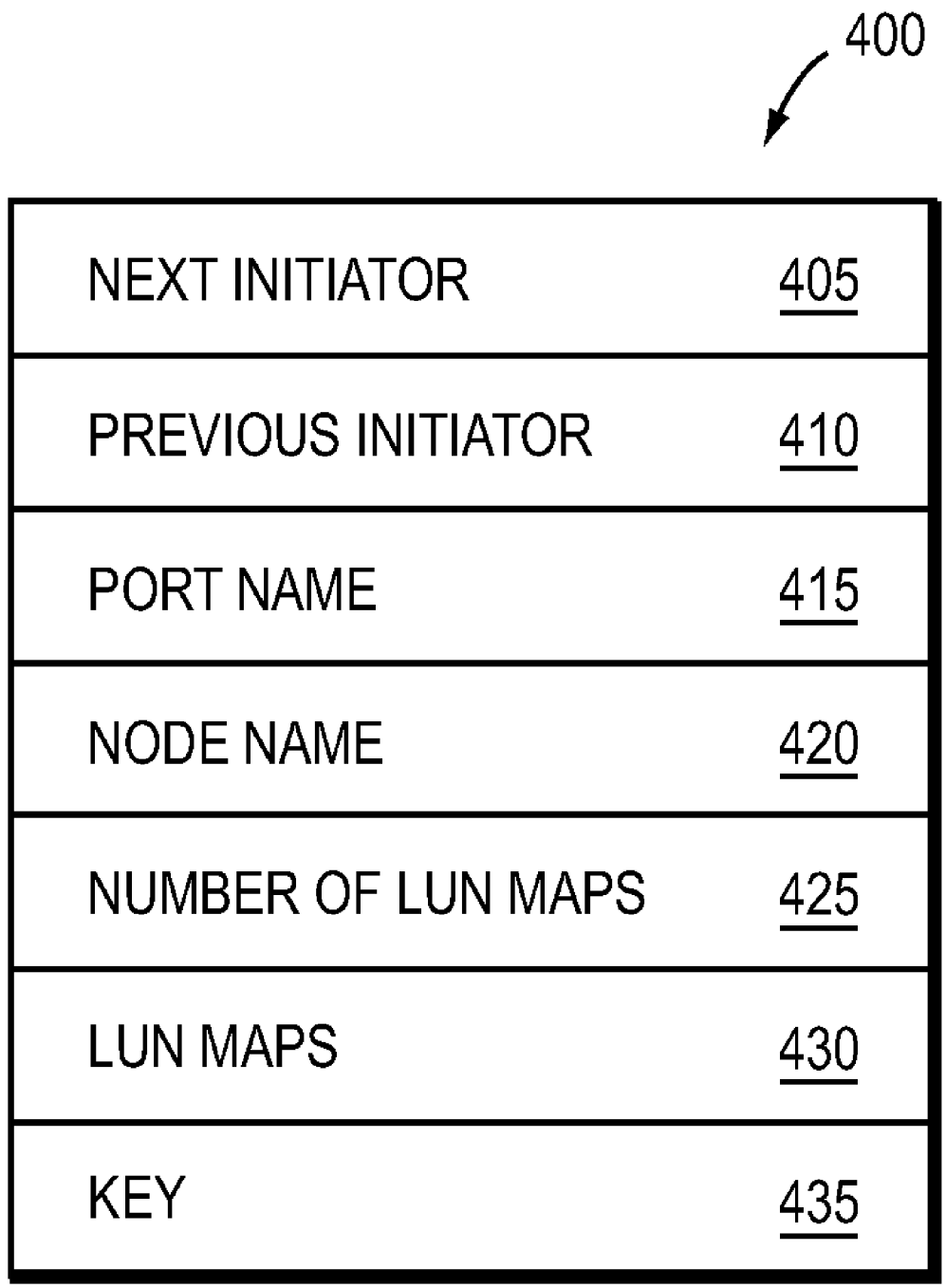
FIG. 4 is a schematic block diagram of an exemplary initiator data structure in accordance with an illustrative embodiment of the present invention.

To that end, each storage appliance in the cluster maintains a set of initiator data structures 400 that is utilized by the storage appliance to store various data relating to initiators connected thereto. FIG. 4 is a schematic block diagram of an exemplary initiator data structure utilized by storage appliances of a cluster configuration in accordance with an illustrative embodiment of the present invention. The initiator data structure 400 includes a next initiator field 405, a previous initiator field 410, a port name field 415, a node name field 420, a number of LUN maps field 425, a LUN maps field 430 and a key field 435, which is an arbitrary number used to look up the initiator 400 that sent the request. The next initiator and previous initiator fields 405, 410 are utilized to maintain a linked list of initiators associated with the cluster. The port name field 415 contains the WWPN of the initiator. Similarly, the node name field 420 contains the WWNN of the initiator. The number of LUN maps field 425 identifies the number of LUN maps 430 associated with the initiator. Each LUN map 430 identifies which LUNs (vdisks) a particular initiator may access, and further contains a mapping of virtual LUNs (VLUNs) to physical LUNs (PLUNs). It is noted that the initiator structure 400, in accordance with the invention may also be configured such that the LUN maps field 430 contains two sets of LUN maps, one local and one for the partner. The partner set is used in the case of a cluster takeover, where all the volumes/vdisks/luns are controlled by only one of the storage appliances (because the other one has failed). In that case, partner failover mode is initiated and, instead of proxying data access requests for an unknown LUN to the partner, the receiving (surviving) node processing the LUN request locally, using the partner LUN maps 430 for that initiator.

In accordance with the invention, and as described in further detail herein, each LUN has an initiator or group of initiators (igroup) associated with it, such that any initiator in that igroup can access those LUNs that are permitted. LUN maps are further described in U.S. Pat. No. 7,523,201, entitled SYSTEM AND METHOD FOR OPTIMIZED LUN MASKING, by Herman Lee, et al., which is incorporated by reference herein in its entirety. As LUN IDs are assigned, the assigned LUN ID is then used by only one storage appliance. It is noted that LUNs can be mapped to multiple initiator groups (igroups) with multiple initiators (assuming no overlaps in LUN IDs across storage appliances).

Figure 5:
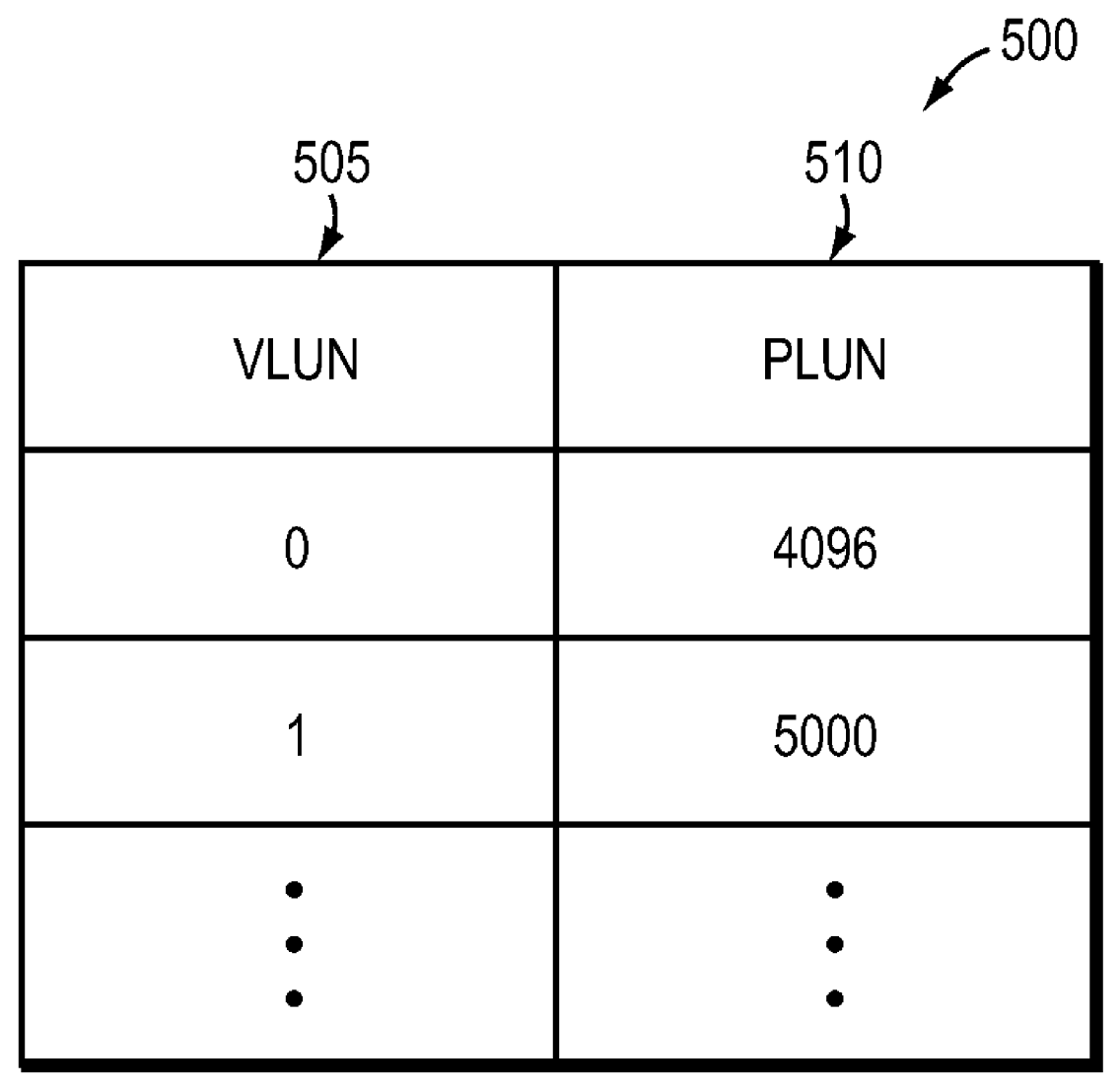

FIG. 5 is a schematic block diagram of an exemplary LUN map in accordance with an illustrative embodiment of the invention. An exemplary LUN map 500, shown in FIG. 5, maps virtual LUNs (VLUNs) to physical LUNs (PLUNs). A VLUN is a LUN returned to a given SCSI initiator in a storage system environment.

As will be understood by those skilled in the art, the storage appliance is an intermediary between clients and vdisks, it typically manages a larger set of LUNs than that visible to a given client. The LUN map 500 in the exemplary embodiment relates to a particular initiator. An overall table of LUN maps defining the LUN space of the entire cluster can also be generated and stored as desired in a particular application of the invention, and this is described in further detail herein with reference to FIG. 9. Returning to the LUN map 500 of FIG. 5, the LUN map has illustratively two columns. The first column, VLUN 505 identifies the virtual logical unit number that a given SCSI initiator is accessing. The second column is comprised of PLUNs 510 that are mapped to a corresponding VLUNs 505. Each VLUN number corresponds to the associated PLUN. Conversely, a PLUN is an actual LUN associated with a vdisk managed by the storage appliance. In accordance with the invention, when a VLUN is initially assigned to an initiator group using its LUN map 500, this VLUN is thus used only by the storage appliance that locally owns the associated PLUN. In the example shown in FIG. 5, VLUN 0 is mapped to PLUN 4096. Illustratively, by way of example, VLUN 1 is mapped to PLUN 5000. It is noted that VLUN 1 is mapped to the next PLUN that is accessible by the particular initiator with which the LUN map 500 is associated; the PLUN is not necessarily the next sequential PLUN in the vdisk.

Figure 6:
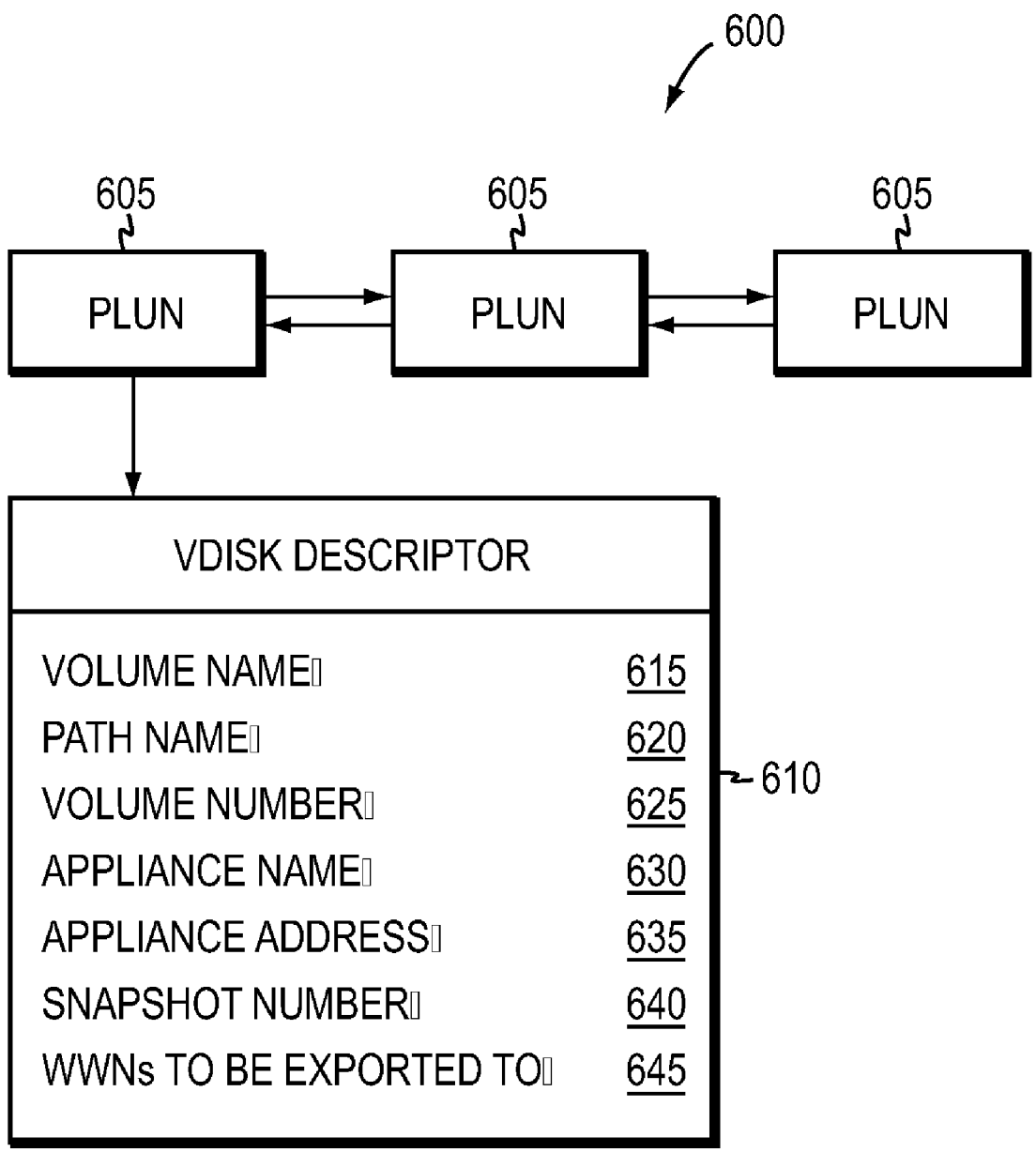
FIG. 6 is a schematic illustration of an exemplary set of linked LUN data structures maintained by the SCSI target module in accordance with an illustrative embodiment of the present invention.

FIG. 6 is a schematic illustration of an exemplary set 600 of linked LUN data structures ("objects") 605 maintained by the SCSI target module in accordance with an illustrative embodiment of the present invention. Each LUN data descriptor object 605 contains various data associated with a given vdisk embodied as that PLUN. This information is used by the storage appliance for management of the given vdisk. Each LUN data descriptor object 605 also, illustratively, includes a vdisk descriptor 610.

Each vdisk (LUN) managed by a storage appliance has an associated vdisk descriptor 610 that includes various data fields for information pertaining to the vdisk. These fields include volume name 615, path name 620, volume number 625, appliance name 630, appliance address 635, snapshot number 640 and a list of WWNs 645 that the LUN is to be exported to. It should be noted that the fields described herein are exemplary only in that additional and/or differing fields may be utilized in accordance with various embodiments of the invention. For example, the volume name 615 field identifies the volume containing the vdisk. The path name field 620 describes a path on the volume identified in the volume name 615 field to the file containing the vdisk. Thus, if the appliance name stored in field 630 is "Appliance 5", the volume name stored in field 615 is "vol0" and the path name stored in field 620 field is "/vdisks/vdisk," then the vdisk identified by this vdisk descriptor 610 may be uniquely identified by the fully qualified path "Appliance5:/vol0/vdisks/vdisk." The list of WWNs 645 stores the WWNs of clients that the LUN is to be exported to and that may access the given LUN. The list of WWNs 645 may be set by an administrator when the vdisk is initially created.

Figure 7:
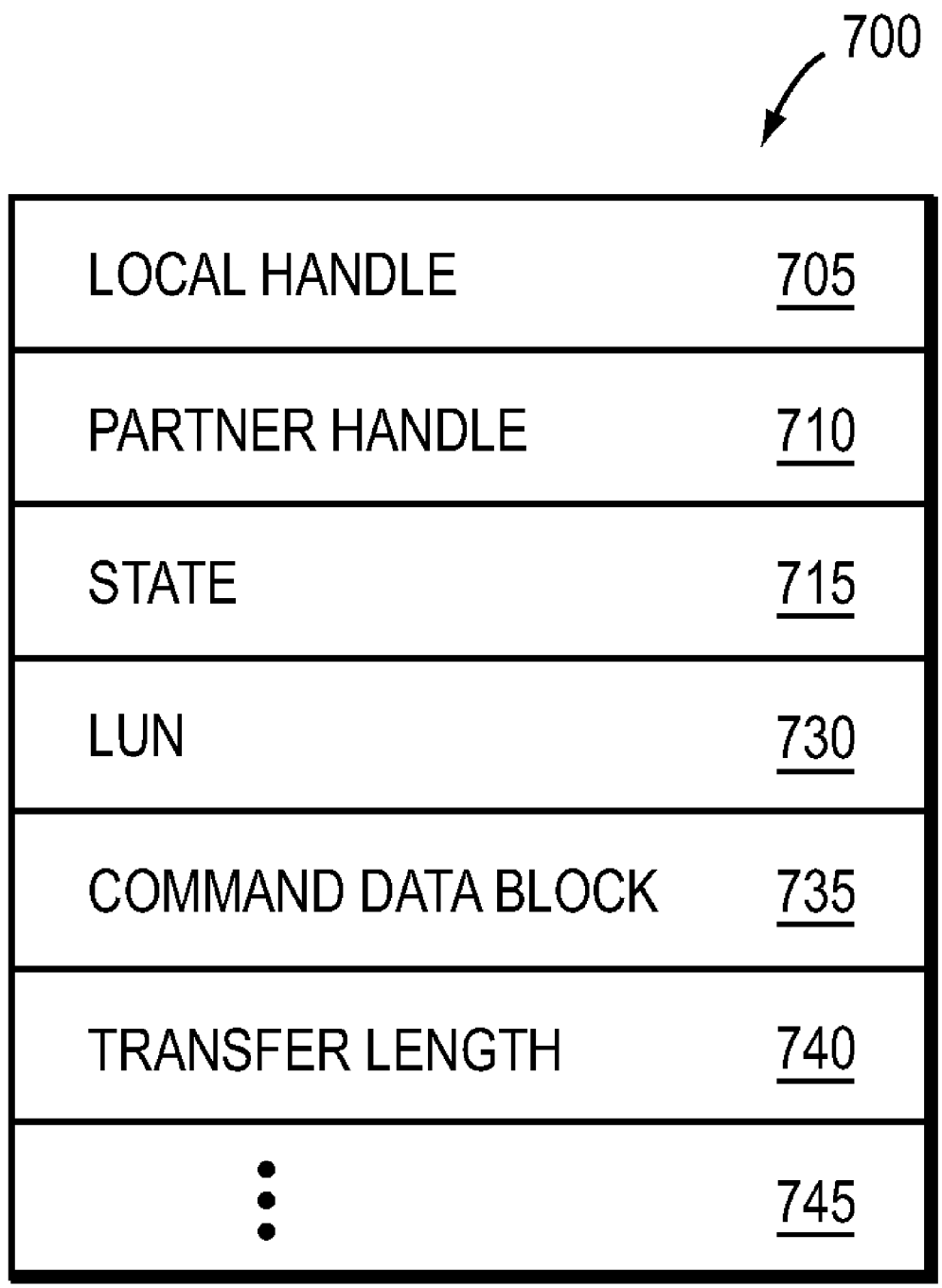
FIG. 7 is a schematic block diagram of an exemplary cluster interconnect data structure in accordance with an illustrative embodiment of the present invention.

FIG. 7 is a schematic block diagram of an exemplary interconnect data structure 700. In the illustrative embodiment, the interconnect data structure 700 is created and forwarded from a local storage appliance over the cluster interconnect 110 to the other storage appliance in response to the local storage appliance receiving a command that is requesting a LUN value treated as "owned" by the other, "partner" storage appliance and thus is to be proxied to the partner.

The interconnect data structure 700 includes a local handle field 705, partner handle field 710, state field 715, port name field 720, node name field 725, LUN field 730, command data block field 735, transfer length field 740 and, in alternate embodiments, additional fields 745. The local and partner handle fields 705, 710 contain local and partner handles that identify command block data structures 800 (FIG. 8) on the local and partner storage appliances used to track a command encapsulated in the interconnect data structure. The LUN field 730 identifies the LUN to which the received command is directed. The command data block 735 contains a received SCSI command data block (CDB) that is forwarded to the partner storage appliance from the local storage appliance. The transfer length field 740 is utilized for tracking the total amount of data transferred in response to a specific command.

Figure 8:
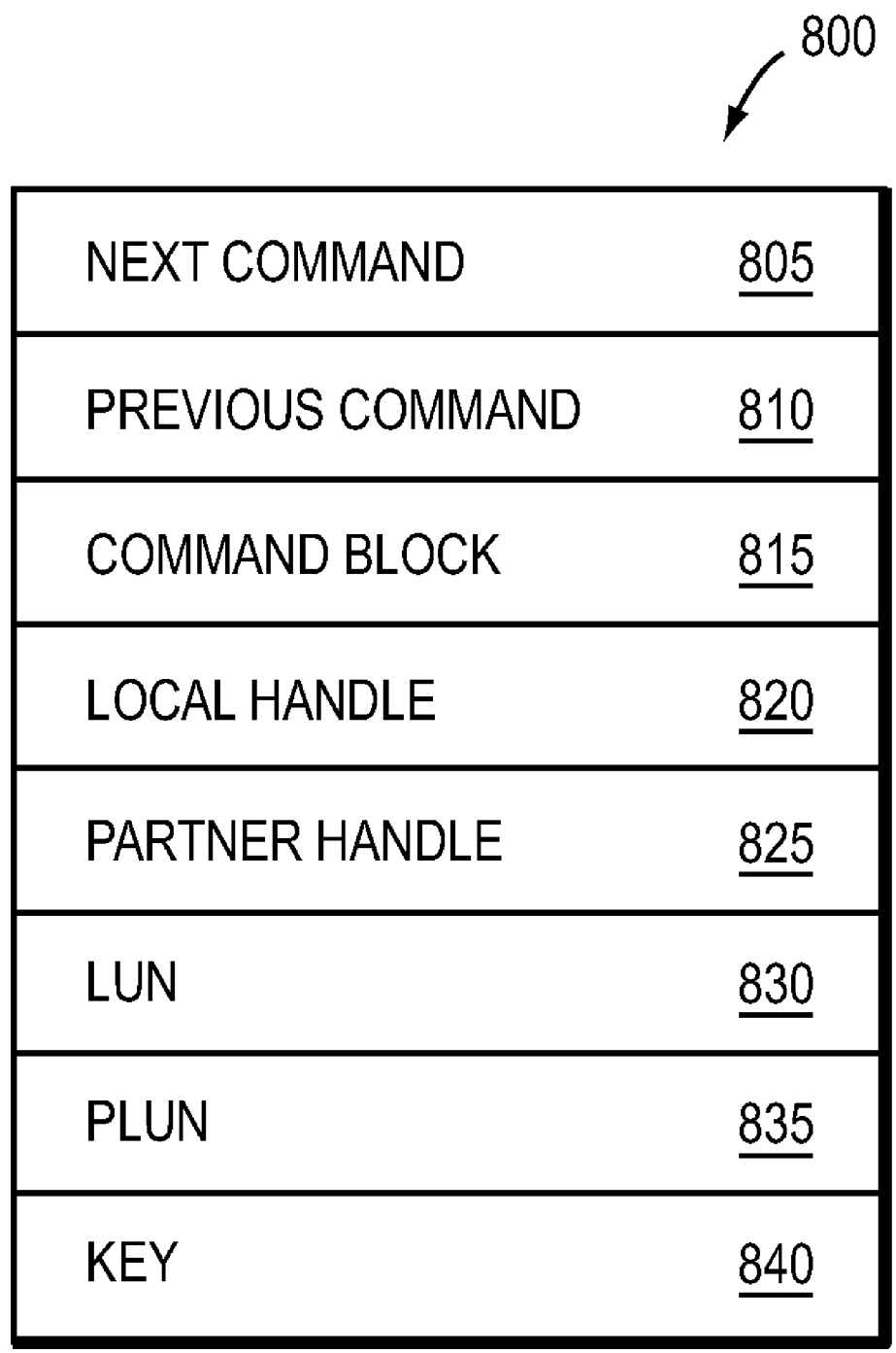
FIG. 8 is a schematic block diagram of an exemplary command datablock in accordance with an illustrative embodiment of the present invention.

FIG. 8 is a schematic block diagram of an exemplary command data block structure (CBD) 800 in accordance with the invention. The local and partner storage appliances utilize command block data structures (CBD) 800 to maintain queues of outstanding commands to be processed. The CBD structure 800 includes a next command field 805, previous command field 810, a command block field 815, local handle field 820, a partner handle field 825, a LUN field 830, and a PLUN field 835, which provides the associated PLUN (605, FIG. 6) to which the LUN 830 maps, as well as a key field 840 which indicates the key of the initiator (as described with reference to FIG. 4) that sent the command. The next and previous command fields 805, 810 contain pointers to additional CBD structures 800 within a queue associated with a given local and/or partner storage appliance. The command block field 815 contains a pointer to a conventional SCSI CBD associated with this command. The local and partner handle fields 820, 825 contain local and partner handles utilized to tag appropriate commands. The local storage appliance tags its requests with the local handle 820 using a specific and storage appliance-unique identifier (ID). Replies from the partner storage appliance contain the appropriate local handle 820 for the local storage appliance to determine an associated target command. Similarly, the partner storage appliance tags its requests with the partner handle 825. Any reply from the local storage appliance contains a partner handle 825 for the partner storage appliance to determine the appropriate target command for a response.

D. Single System Image

In accordance with the invention and with reference to FIG. 1B, each cluster 130 is assigned a unique worldwide nodename (WWNN) which is illustratively a 64 bit value. Each storage appliance in the cluster, such as the storage appliance 200*a* and the storage appliance 200*b*, can be accessed using this single worldwide nodename. Thus, an initiator can access data which is "owned" by either storage appliance by addressing the cluster generally. If the storage appliance that initially receives the request (the "receiving storage appliance") locally owns a particular LUN that is being requested, then the receiving storage appliance accesses that LUN and serves the data accordingly. If the receiving storage appliance does not locally own the requested LUN, it simply forwards the request to the other storage appliance. If the other storage appliance locally owns the disk, the request is processed by that storage appliance, as described further herein. If not, a NO SUCH DEVICE error message is generated and sent to the host.

In accordance with an illustrative embodiment of the present invention, the single system image FC enhancement mode is illustratively implemented in various application programming interface (API) messages which also have corresponding command line interface (CLI) commands as described herein; however, it should be understood that various other commands and instructions may be used to implement the functionality of the present invention in addition to those described herein.

More specifically, the LUN space of the entire cluster is initially configured using a LUN map command line interface in such a manner that when running in single system image mode, the LUN map command forces unique LUN IDs to be assigned to the LUNs in each storage appliance in the cluster. Illustratively, using the LUN map command, the LUN ID space is split into three areas. For example, the LUN ID space from 224 to 239 is reserved space, which in accordance with the invention is assigned to the first storage appliance in the cluster such that LUNs locally owned by that first storage appliance are assigned numbers within that range. Similarly, the LUN ID space from 240 to 255 is also reserved space, and it is assigned to the other storage appliance in the cluster such that LUNs locally owned by the second partner storage appliance are assigned ID numbers from within the second range from 240 to 255, for example. The space from 0 to 223 is shared space that is available for use when assigning new LUNs by either storage appliance, but once a particular LUN ID value is assigned from that space by one storage appliance it is not available for use by the other storage appliance. In order to force this type of LUN mapping to occur a system administration uses the LUN map commands upon initial configuration of the single system image mode for the SAN. The LUN ID information compiled using the LUN map command is stored in the various data structures previously described. A complete LUN map of the entire cluster LUN space can be separately stored in the memory of the operating system in a suitable manner as desired in a particular implementation of the invention.

Figure 9:
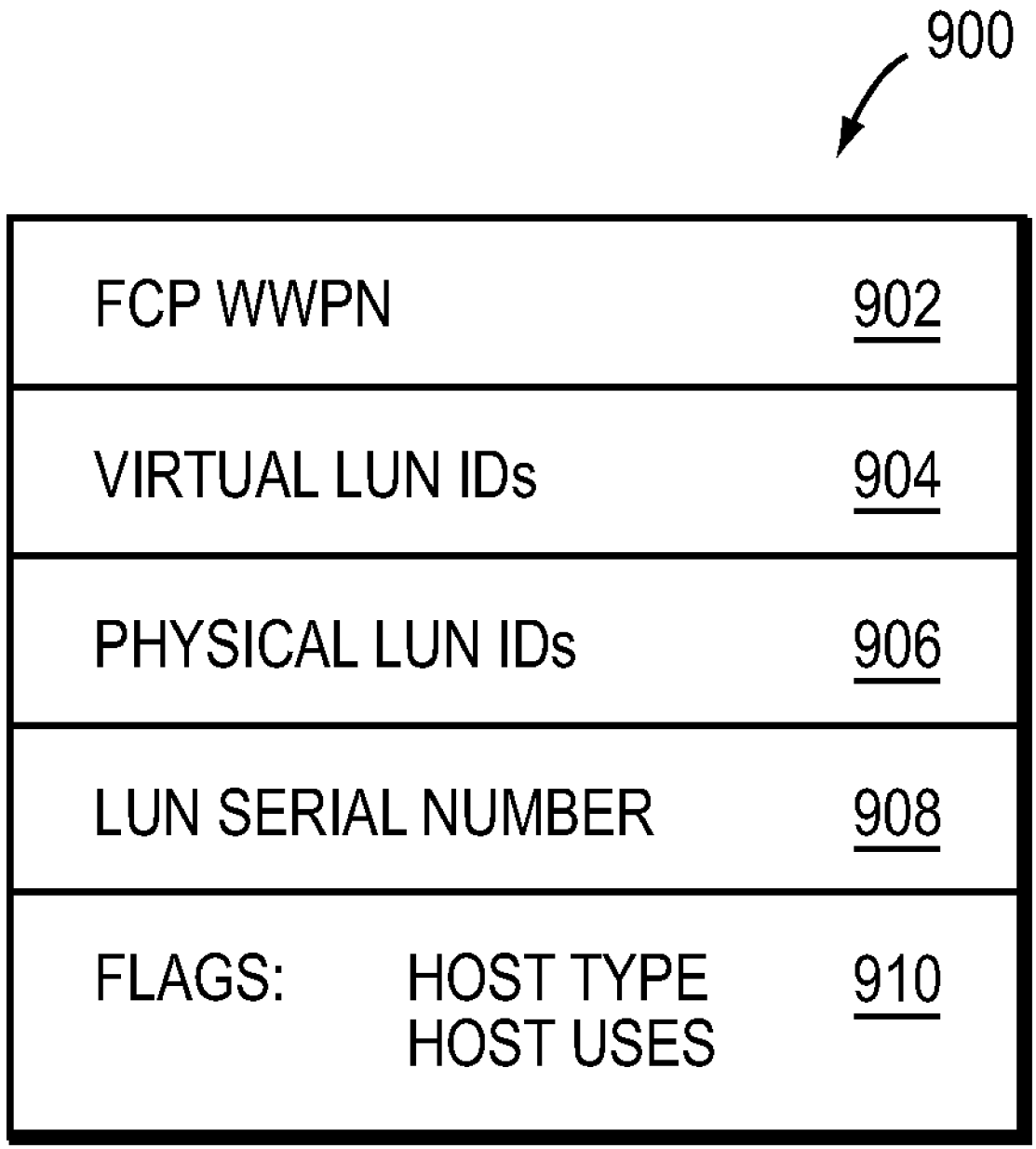
FIG. 9 is a schematic block diagram of a table entry for an illustrative embodiment of the LUN map table that each storage appliance in the cluster stores regarding LUNs mapped by the partner storage appliance.

More specifically, FIG. 9 is a schematic block diagram of a table entry 900 for an illustrative embodiment of a LUN map table that each storage appliance in the cluster can be configured to store regarding LUNs mapped by the partner storage appliance. In this illustrative implementation, each storage appliance, has a table that lists what LUNs the partner has mapped. The table illustratively includes entries for each host or initiator served by that storage appliance, such as that shown in FIG. 9, which includes a Fibre Channel protocol world wide port name, FCP WWPN 902, and the initiator's virtual LUNs VLUNs 904 as mapped to the corresponding physical LUNs PLUNs 906. In addition, a LUN serial number (as defined by SCSI) 908 can be included as well as a series of flags 910 which may include a flag indicating the host type (i.e., Windows®, Solaris® and the like) and/or host uses, etc. Other entries may be included in particular applications of the invention while remaining within the scope of the present invention. These tables will be updated periodically to maintain an accurate depiction of the current LUN mappings of the relevant storage appliance, or for the cluster as a whole.

The tables as described with reference to FIG. 9 may be used to optimize the LUN routing, and to allow LUN mapping checks to be made without having to repeatedly send queries to the partner storage appliance to ask for information about its LUN mappings. It is also useful in cases in which the cluster interconnect 110 fails. More specifically, this mode is used in such circumstances to allow the storage appliance to answer a subset of SCSI commands so that the host can remain informed and in proper operation even when the cluster interconnect is down. For example, if the receiving storage appliance is receiving data access requests when the cluster interconnect is down, and if the receiving appliance does not have the requested LUN, the receiving storage appliance is configured to return an error message appropriate for the type of host sending the request, instructing the host to attempt the command again by forwarding it to the partner storage appliance, and not to fail. If the partner storage appliance does not have the requested LUN, then it returns a NO SUCH DEVICE error message to the host immediately. Otherwise, the host would not have been instructed to forward the request, due to the failed cluster interconnect, thus the host would not have received a reply, which could lead to service disruption, such as time outs, I/O failure or even host system panic events.

To further implement the techniques of the present invention, a LUN configuration check utility is provided. The LUN configuration check utility can be varied depending upon the programming of the system. Once the system is running in single system image mode, the LUN configuration check utility is illustratively scheduled to run hourly to perform the following checks in accordance with an illustrative embodiment of the invention:

1. Make sure there are no LUN map conflicts;
2. Make sure all initiators have matching operating system type settings;
3. Make sure no new LUNs are mapped in the reserved ranges; and
4. Make sure the nodename of each storage appliance is the same.

If any of these tests fail, then a warning message is generated for the administrator. The LUN configuration check utility can also be run to perform configuration checks even when the system is running in a different mode. This allows the user to test a particular LUN space configuration before initiating the single system image mode.

In accordance with the present invention, an add command is used when a new storage appliance is added to the cluster. The add command can be extended to check that a new node being added to the group does not have an operating system conflict with the other storage appliances in the cluster. An alert flag can be used during a cluster break condition when a node must be added.

Further in accordance with the invention, appropriate commands allow for a new LUN to be brought online. A -f option is illustratively needed to bring a LUN online when the interconnect cluster interconnect is inoperative (down). This is not ideal because it will disable cross cluster checking, and a LUN map conflict could arise because information may not be available without the cluster interconnect.

Thus, to summarize, three new API messages relating to LUNs are provided which can have equivalent command line interface versions and these are a LUN map command, an add command, and a LUN online command. Additional API messages and command lines in accordance with the invention are includes for FCP (Fibre Channel protocol) which allows the media type for the adapter to be changed while running in single system image mode. Fibre Channel configuration command identifies the Fibre Channel configuration mode, which in the present case is "single system image mode" meaning that the instructions of enhancement mode 331 in the storage operating system 300 are invoked (FIG. 3) to enable the cluster to appear as a single target. An FC configuration for a partner disables the partner adapter setting because single system image mode is not traditional partner mode. The novel enhancement mode of the present invention also includes a command that indicates that the single system image mode is available as an option on the storage system, in addition to other optional modes used for proxying data access requests or for operating in failover mode, such as partner mode and mixed mode. Another command is used to initiate the single system image mode and a LUN configuration check is used to check the configuration by, e.g., running a configuration check and returning any errors.

Figure 10:
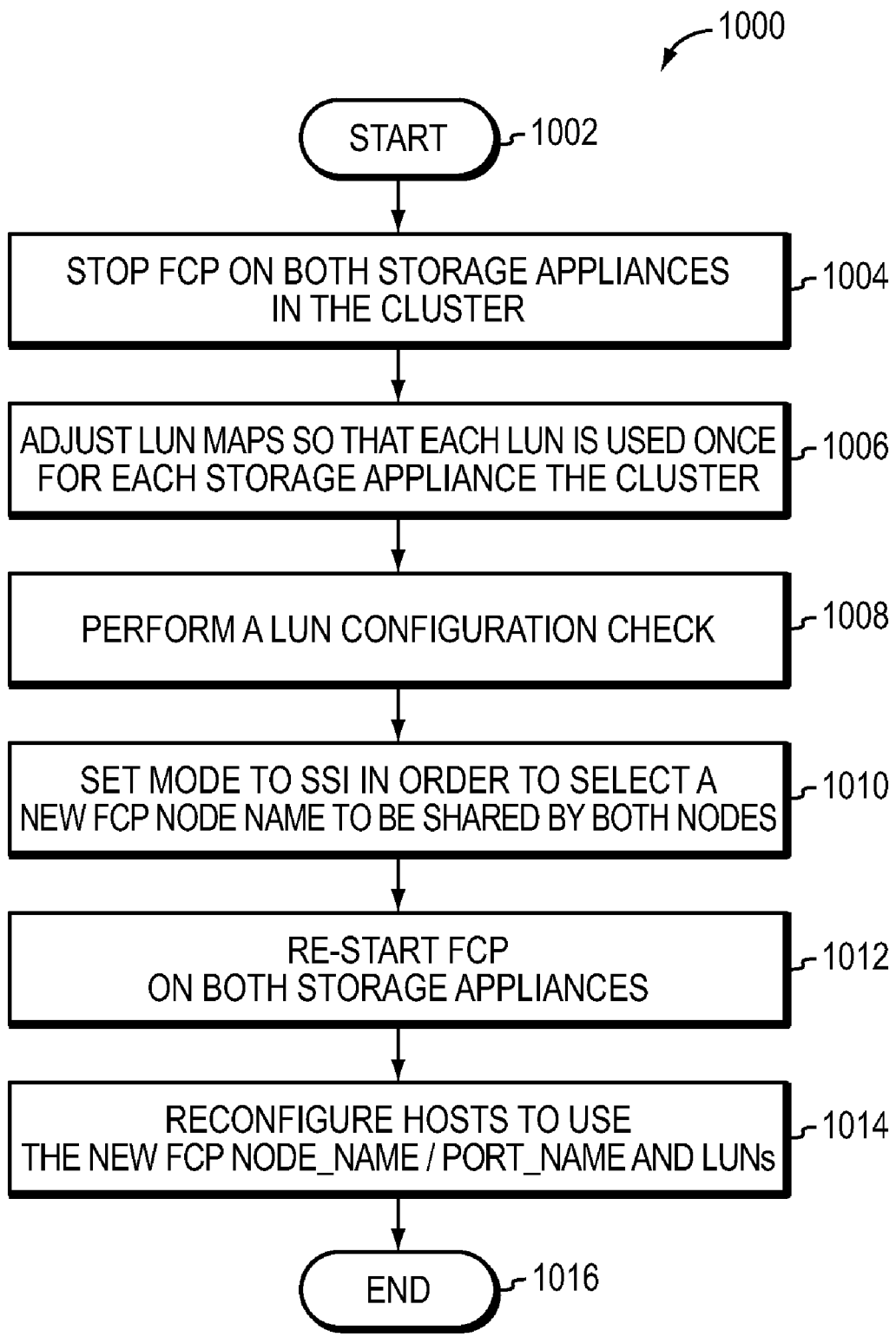
FIG. 10 is a flow chart of a procedure for initial configuration of a storage appliance cluster to enable operation in a single system image mode in accordance with an illustrative embodiment of the present invention.

FIG. 10 is a flow chart of a procedure 1000 for initial configuration of a storage appliance cluster to enable operation in a single system image mode in accordance with the present invention. The procedure starts at step 1002 and proceeds to step 1004 in which a currently running FCP protocol is stopped on both storage appliances in the cluster. In step 1006, as LUN IDs are assigned each LUN ID is applied once for each storage appliance in the cluster. LUN maps are adjusted accordingly using the above described LUN map command. In step 1008, the LUN configuration check utility is used to confirm that this has been performed correctly. It is noted that the LUN configuration check utility can be performed prior to stopping the FCP as shown in step 1004, if the LUN configuration check minus f option is used. The FCP mode is set to single system image as shown in step 1010 in order to select the new single FCP worldwide nodename to be shared by both nodes.

It is also noted that, illustratively, a common Veritas ASL serial number will be stored across both storage appliances. More specifically, many hosts with which the system of the present invention can be employed are supported by VERITAS software, as will be known to those skilled in the art. The VERITAS based host/initiator uses a serial number, (i.e., a train or sequence of numbers) in connection with its LUNs to determine the type of storage system with which each LUNs is associated. In accordance with the present invention, in order that the storage appliances in the cluster appear as one device to the host, both storage appliances in the cluster will be assigned the same VERITAS ASL serial number, in which "ASL" relates to an array support library, which is the VERITAS term for a vendor specific multipathing software plug-in that operates to verify the serial number, and to obtain path priority for LUNs. In other words, illustratively, both storage appliances in the cluster will have the same VERITAS ASL serial number thus allowing the paths for each storage appliance to have the same attributes and behaviors so that the single system target (i.e., the cluster) is treated as one device by the VERITAS software.

Returning to FIG. 10, the FCP is then restarted on both storage appliances, as in step 1012. In step 1014, the clients are reconfigured to use the new FCP single nodename/portname and new LUN IDs are set as needed. Notably, the storage appliance will not allow the single system image mode to be enabled if the IC is down, unless it is running in the mode that implements the LUN mapping tables as described with reference to FIG. 9. The procedure ends at step 1016 and the cluster is now configured to run in the single system image mode in accordance with the present invention.

Figure 11:
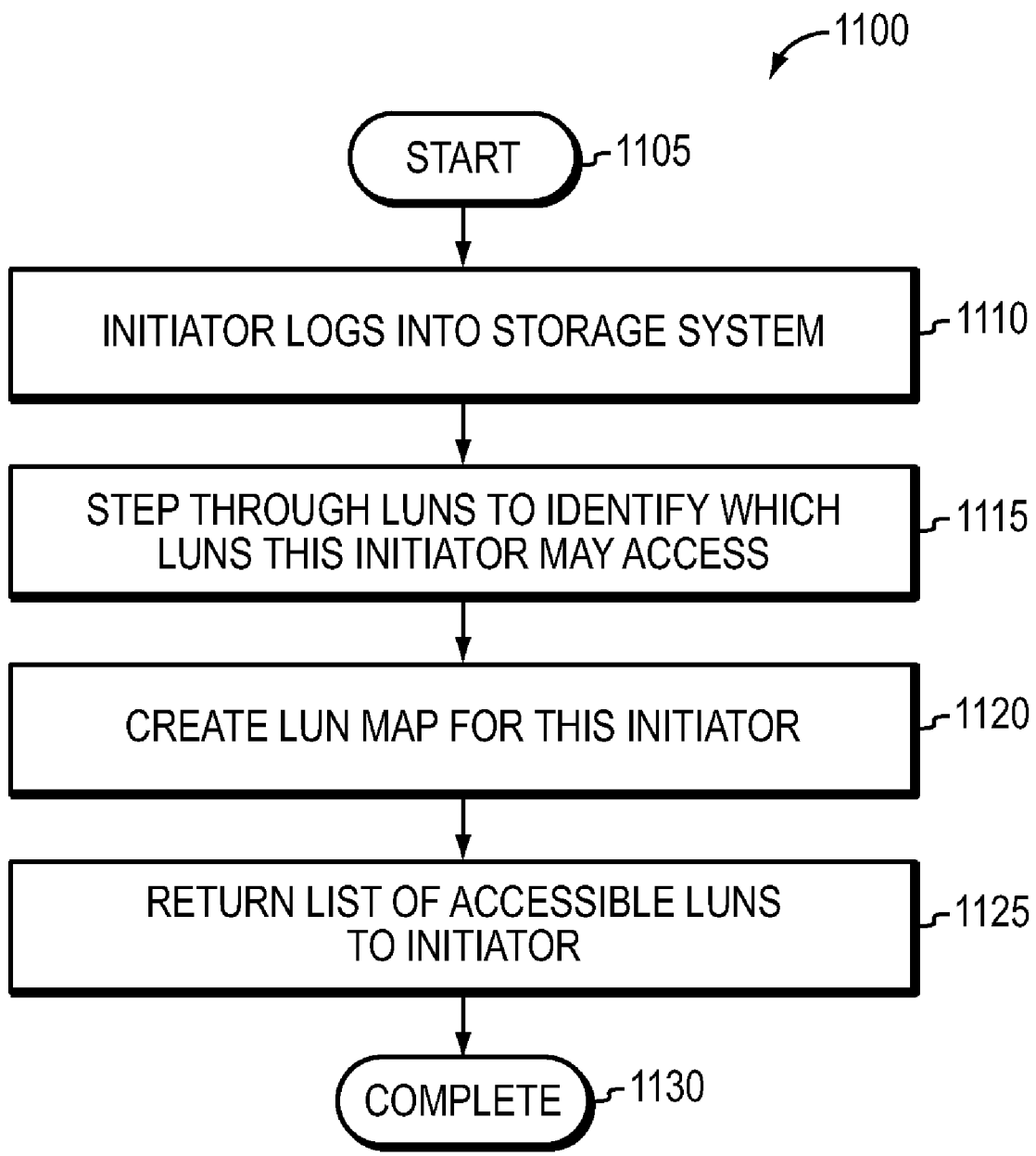
FIG. 11 is a flow chart of a procedure for use when an initiator logs in to the system for the first time in single system image mode in accordance with an illustrative embodiment of the present invention.

In response to successfully being initially configured, the storage appliance cluster can begin processing data access requests in single system image mode, but the initiator must first log into the system. FIG. 11 is a flow chart of a procedure for use when an initiator logs in to the system for the first time in single system image mode in accordance with an illustrative embodiment of the present invention. It is noted that as described previously, each of the initiator data structures 400 includes a LUN map 500 that is generated when the initiator first logs into the system. In the illustrative embodiment, this LUN map is utilized to allow the cluster to determine which storage appliance locally owns the LUN. It can also perform a LUN masking function such that only clients who are permitted to access a given LUN are enabled to have access to that specified LUN. Thus, the use of the LUN map 400 within an initiator data structure 500 as described herein improves system performance.

The steps of an exemplary procedure 1100 performed by the storage system for creating a LUN map in accordance with an embodiment of the present invention are shown in FIG. 11. The procedure 1100 initially begins in step 1105 and then proceeds to step 1110 where the initiator logs into the system. This login may be accomplished by using conventional SCSI protocol commands. Once the initiator has logged into the storage system, the storage system then, in step 1115, walks through each of the linked LUN data structures 500 associated with the storage system to identify the PLUNs that this initiator may access. This may be accomplished, by example, by searching for the initiator's WWN in the list of WWNs to be exported field 645 (FIG. 6) of each of the LUN descriptor objects 605. After the list of PLUNs that are accessible to the initiator has been identified, the procedure, in step 1120, then creates a LUN map 400 for this initiator that associates those PLUNs to VLUNs and incorporates the map into the initiator data structure associated with the initiator. That is, the LUN map will identify the mappings of the virtual LUNs to be exported to the initiator to the physical LUNs associated with the storage system, and will use a suitable LUN ID numbering convention in accordance with the present invention that also associates the LUN with the storage appliance that owns it, as described herein. After the LUN map has been generated, a list of VLUNs can be returned to the initiator in response to a SCSI REPORT_LUNS command, if sent by the initiator, but this is not required (optional step 1120). At this point the initiator has successfully logged into the storage system and the procedure is complete (step 1130). After the LUN map is generated, it can also be stored in the tables described with reference to FIG. 9, if desired in a particular application of the invention.

To summarize, once the initiator has been logged into the storage system, it may issue SCSI commands to any of the VLUNs that have been exported to it. Upon receipt of one of these SCSI commands, the storage system first must determine if the initiator is permitted to access the LUN identified in the SCSI command. This LUN masking ensures that only those initiators with the proper security permissions may access the data stored on a given LUN.

Figure 12:
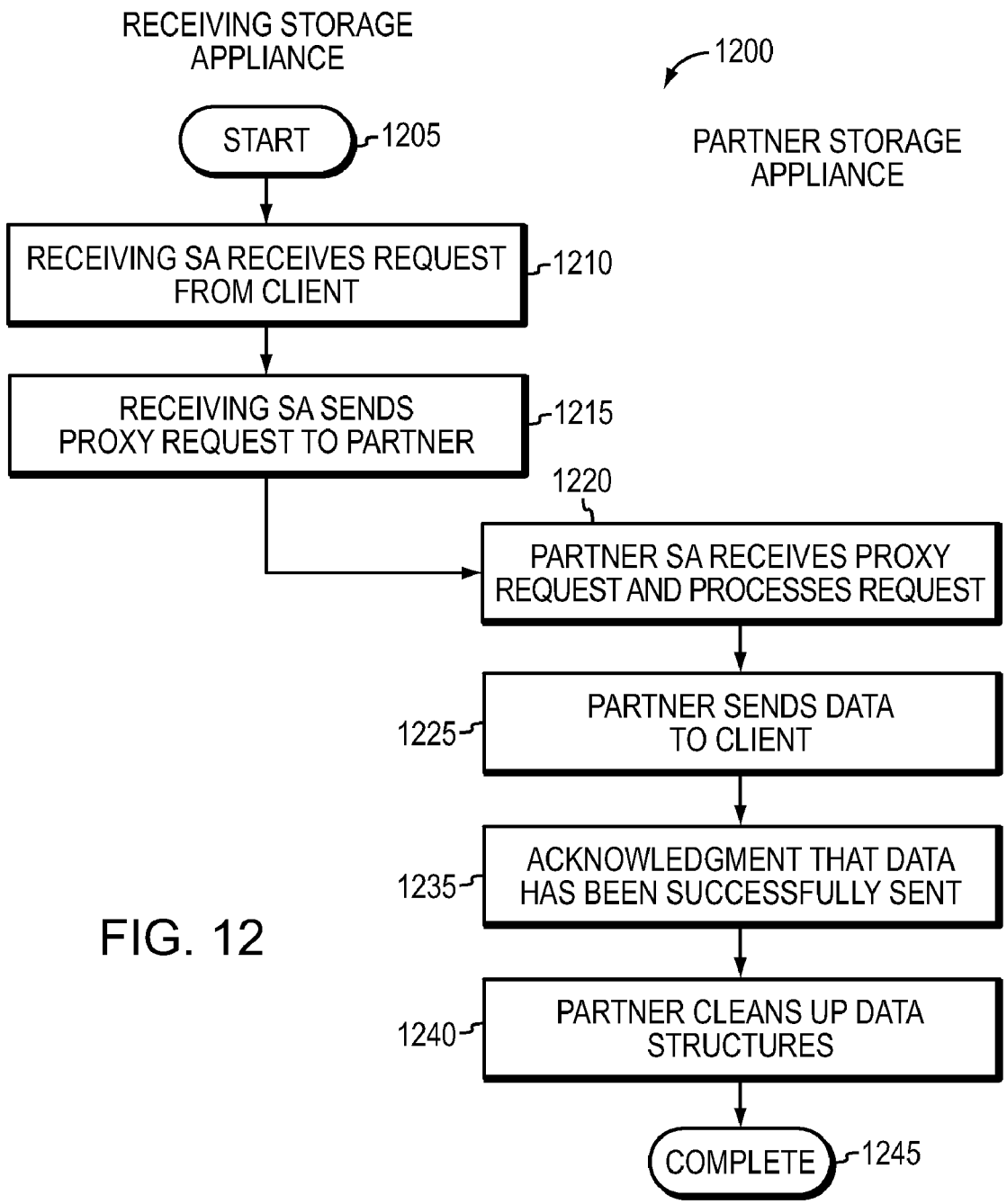
FIG. 12 is a flowchart of a procedure for processing a data access requests in the clustered storage environment in accordance with an illustrative embodiment of the present invention.

Once logged into the system, the initiator can begin to send data access requests to the cluster. FIG. 12 is a flowchart of a procedure 1200 for processing a data access request in the clustered storage environment in accordance with an illustrative embodiment of the present invention. The procedure begins in step 1205 and proceeds to step 1210 where the first storage appliance ("the receiving storage appliance") receives a request from a client via one of its ports. The received request is examined at the SCSI target layer of the storage operating system. The SCSI target layer examines the LUN value 830 in the command data block structure 800 (FIG. 8). If the LUN is associated with a local storage device, then the request is processed at the receiving storage appliance. If the LUN value is not locally owned by the receiving storage appliance, the virtual target adapter of the storage operating system on the receiving storage appliance forwards the request. Specifically, the command data block structure 800 is embedded in interconnect data structure 700 (FIG. 7) and is forwarded over the cluster interconnect to the partner storage appliance ("partner node") in step 1215.

The partner storage appliance receives and processes the proxy data access request in step 1220. If the proxy data access request is a write operation, the data is written to the appropriate disks. Alternately, if the proxy request is a read command, the appropriate disk blocks are retrieved from disk. Next, in step 1225, the partner storage appliance sends data responsive to the proxy request to the client. In the case of a write operation, the responsive data may comprise an acknowledgement that the requested data has been written or an error condition. In the case of a read operation, the responsive data may comprise the requested read data or an error condition.

This is accomplished by, for example, creating an appropriate SCSI, FCP or iSCSI response from the responsive data and forwarding it to the initiator. Once the data has been returned to the client, the partner storage appliance waits for an acknowledgment that the data has been successfully returned in step (1235). In response to receiving the acknowledgement, the partner node "cleans up" appropriate data structures that were generated in processing the data access request (step 1240). The procedure then ends in step 1245.

Figure 13:
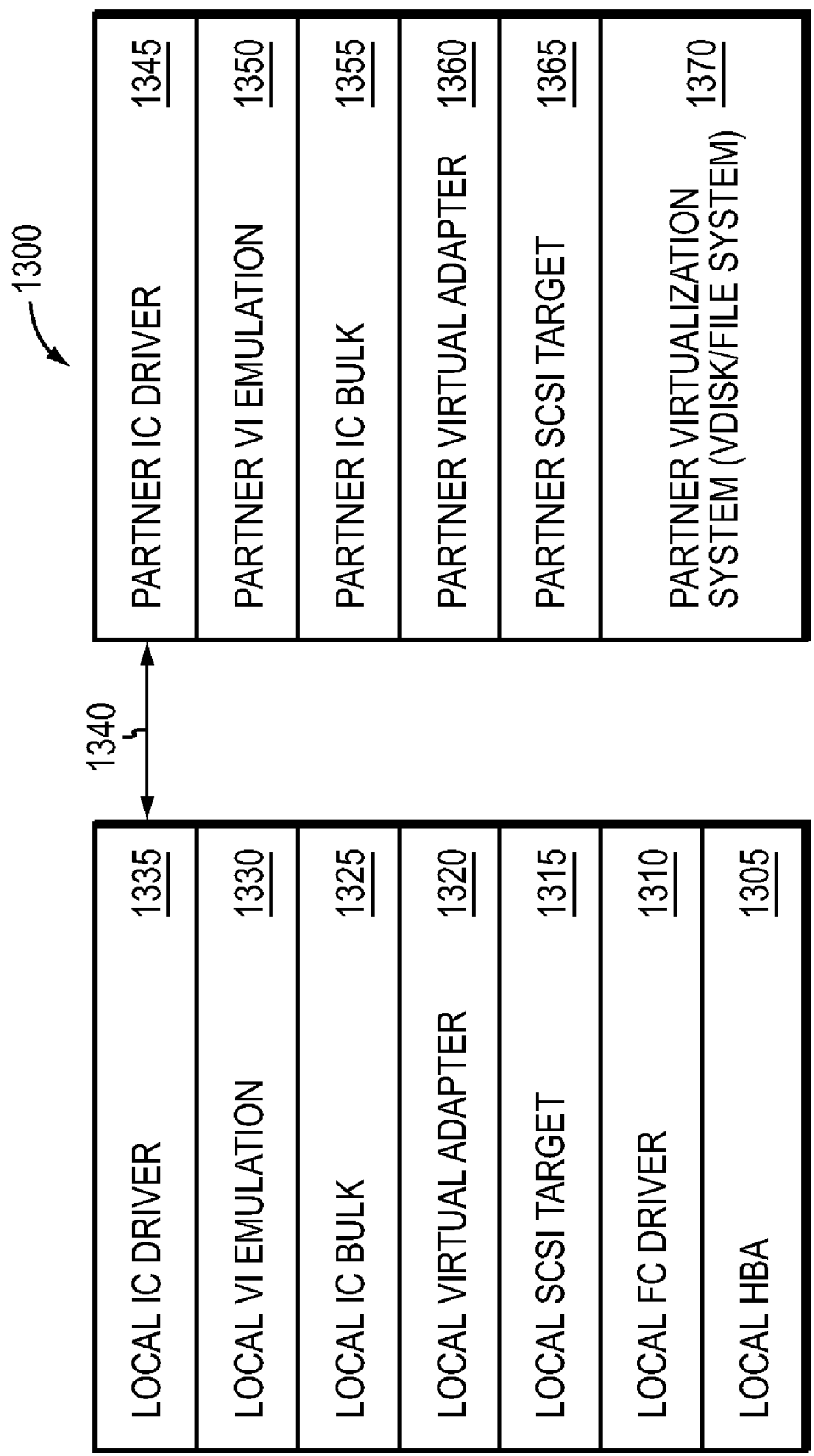
FIG. 13 is a schematic block diagram illustrating various software layers that a proxy data access request passes through in accordance with an illustrative embodiment of the present invention.

FIG. 13 is a schematic block diagram illustrating various software layers that a proxy data access request passes through in accordance with this aspect of the present invention. A client sends a request to the receiving storage appliance, where it is received at an appropriate port of the local HBA 1305. The request is then passed to the local FC driver 1310.

Specifically, the local FC driver 1310 strips the FC header or footer information from the received request and passes "payload" SCSI command to the local SCSI target module 1315. In the illustrative embodiment, this forwarding decision (e.g., as to whether the payload command is forwarded to the local SCSI target module 1315 or to the virtual target adapter 365 of FIG. 3) is made based on the LUN ID of the requested data. It should be noted that in alternate embodiments, this forwarding decision may be based on other criteria, including, for example, an address of the initiator originating the SCSI command.

Assuming that the command is to be forwarded to the other storage appliance, the SCSI target module 1315 passes the command to the virtual adapter 1320. Thus, the local SCSI target module 1315 performs the forwarding decision as to where the received command is to be sent. In certain clustering configurations, there may be a plurality of storage appliances. In such configurations, the local SCSI target module 1315 makes a forwarding decision based upon the intended destination of the command and forwards the command to the appropriate local virtual adapter 1320.

The local virtual adapter 1320 acts as an adapter for a "virtual" SCSI device, and, as such, passes the command to the local interconnect (IC) bulk layer 1325, which provides appropriate flow control functionality when passing the command over the local VI emulation 1330. The local VI emulation layer 1330 interfaces with the local interconnect driver 1335 to send an appropriate RDMA write/read operation over the physical cluster interconnect 1340.

The data request is then received by the partner interconnect driver 1345 and passed via the partner VI emulation and IC bulk layers 1350 and 1355 to a partner virtual adapter 1360. The partner virtual adapter 1360 passes the received command to the partner SCSI target module 1365, which then interfaces with the partner virtualization system 1370. The partner virtualization system implements as the appropriate vdisk or file system primitives to perform the requested command. The responsive data is then passed from the partner virtualization system 1370 to the partner SCSI target module 1365, which then passes the response data through the interconnect communication stack comprising the partner virtual adapter 1360, partner IC bulk 1355 and partner VI emulation layers 1350 to the partner IC driver 1345. The partner interconnect driver 1345 then transmits the response over the physical interconnect 1340 to the local interconnect driver 1335. Once the local interconnect driver 1335 has received the response data, it is passed through the various software layers to the local virtual SCSI target module 1315, which generates an appropriate SCSI response and data structure. The generated SCSI response is then passed to the local FC driver 1310 to be sent out via the local HBA 1305 to the requesting client.

Upon receipt of a command for a non-local LUN, the local storage appliance processes the command through the network stack to a virtual SCSI target module. The virtual SCSI target module forwards the command via a cluster interconnect communication stack to the cluster interconnect driver which forwards the command over the cluster interconnect to the partner storage appliance. At the partner storage appliance, the command is received by the cluster interconnect driver and passed to the cluster interconnect communication stack to the virtual SCSI target module. From the partner storage appliance's virtual SCSI target module, the command is passed to the virtualization system and file system for execution. Returning data is then passed either directly to the clients or through the partner storage appliance's cluster interconnect communication stack over the cluster interconnect to the local storage appliance's cluster interconnect driver. The local storage appliance cluster interconnect driver passes the received data back to the virtual SCSI target module, where an appropriate response to the client is generated and forwarded back via the network protocol stack of the storage operating system.

In one embodiment, data access requests transferred over the cluster interconnect are limited to an arbitrarily chosen size, e.g., 64 KB in size. Thus, to accommodate write operations that are larger in size, multiple transfers over the cluster interconnect may be required. In such transfers, the data is sent sequentially, i.e., the first 64 KB, the second 64 KB, etc.

During takeover, the initiator obtains LUN maps for both the local and the partner storage appliance. During takeover, both the local and the partner LUN maps are used to get a complete list of the LUNs that are used by the cluster as a whole. Thereafter, the normal takeover, e.g., where volumes are switched over to the surviving storage appliance will then apply. In order to report the LUNs that are used by the cluster, a report command can be sent and is processed to get the list of LUNs mapped to the initiator from the partner. This information is merged with a local LUN map list and a combined response is sent.

If the cluster interconnect (IC) fails, the two storage appliances in the cluster can still function independently to serve data requests, however, each storage appliance may not have complete information about the operations of the other storage appliance. This condition is sometimes referred to as "split brain." The partitioning of the LUN address space, in accordance with the invention as discussed above, is also helpful in such IC failure circumstances because LUN maps created during a "split brain" will not conflict with LUNs mapped on the other storage appliance. More specifically, storage appliance A is restricted to LUNs X through Y and storage appliance B is restricted to Y+1–Z where X is less than Y is less than Z. A LUN map -f is required to let the user choose its own LUN ID. A user typically will choose an earlier LUN in the public space and not a later private LUN area. Thus the private LUN area should be simple and work for most hosts. A convention can be determined by the administrator whereby private LUN map ranges are chosen based on storage appliance serial number, for example. The storage appliance with the lower serial number will get the lower range, and so on.

To again summarize, the present invention is directed to a system and method for providing a single system image for a clustered storage network, including techniques for processing data access commands between storage appliances over a cluster interconnect in a storage appliance cluster. The system is configured such that the cluster is assigned a single world wide nodename. Requests coming to the cluster from client initiators are directed to one of the storage appliances in the cluster, i.e. the "receiving" storage appliance. Commands received by the receiving storage appliance are examined to determine the LUN value(s) in the requests. If the LUN value is associated with a local storage device, the request is processed by the receiving storage appliance. If instead, the LUN value is associated one of the other storage devices in the cluster, then the request is conveyed over the cluster interconnect to the partner storage appliance to be processed and the appropriate data written or retrieved.

The forgoing description has been directed to specific embodiments of the invention. It will be apparent, however, that other variations and modifications may be made to the described embodiments, with the attainment of some or all of their advantages. Specifically, it should be noted that any number of HPAs may be utilized in accordance with the invention and any number of virtual ports may be associated with a given physical port. Moreover, the procedures are processed and may be implemented in hardware, software embodied as a computer-readable medium having program instructions, firmware or a combination thereof. Therefore it is the object of the appended claims to cover all such variations and modifications as come within the true spirit and scope of the invention.

What is claimed is:

1. A method, comprising:
    coupling a plurality of storage systems in a cluster of a storage network;
    applying a single node identifier to each storage system in the cluster, wherein the cluster appears to a client of the storage network as a single storage system;
    receiving a request at a first storage system of the plurality of storage systems in the cluster from the client using the single node identifier for data stored on a storage device operatively connected to the cluster; and
    servicing the request by the first storage system in response to receiving the request.

2. The method as defined in claim 1 wherein the single node identifier comprises a Fibre Channel (FC) worldwide node name.

3. The method as defined in claim 1 further comprising:
    identifying the data stored on the storage device by a Logical Unit Number (LUN); and
    identifying the LUN by a LUN identifier (LUN ID) and a LUN space.

4. The method as defined in claim 3 further comprising performing a LUN configuration check.

5. The method as defined in claim 4 wherein the LUN configuration check comprises ensuring a new LUN is not mapped in a reserved range of the LUN space.

6. The method as defined in claim 3 wherein the LUN ID is used by only the first storage system.

7. The method as defined in claim 6 wherein servicing the request comprises:
    examining by the first storage system the request for the LUN ID of the data requested by the client; and
    making a forwarding decision by the first storage system based upon the LUN ID.

8. The method as defined in claim 7 further comprising forwarding the request to a second storage system of the plurality of storage systems in the cluster if the LUN identified by the LUN ID is not locally owned by the first storage system.

9. The method as defined in claim 8 wherein forwarding comprises proxying the request to the second storage system.

10. The method as defined in claim 8 wherein the forwarding decision is made within the cluster without involvement of the client.

11. The method as defined in claim 1 wherein the single node identifier comprises a serial number.

12. The method as defined in claim 1 further comprising generating by the first storage system a table listing a plurality of LUNs mapped in the cluster.

13. The method as defined in claim 12 further comprising configuring a partner storage system of the first storage system to store the table.

14. The method as defined in claim 12 wherein servicing the request comprises:
    consulting the table of the partner storage system; and
    returning a reply to the client with the data.

15. A system, comprising:
    a plurality of storage systems operable in a clustered storage environment configured to provide storage services for a client of the clustered storage environment, the plurality of storage systems further configured to connect to a storage device comprising data, wherein each of the plurality of storage systems in the cluster is further configured to be set with a single node identifier and wherein the cluster appears to the client as a single storage system; and
    the plurality of storage systems further configured to establish a communication path between the plurality of storage systems via a cluster interconnect.

16. The system as defined in claim 15 further comprising a program configured to execute on a first storage system of the plurality of storage systems to examine an incoming data access request from the client for the data identified by a Logical Unit Number Identification (LUN ID) value and further configured to forward the data access request across the cluster interconnect to a second storage system of the plurality of storage systems if the data identified by the LUN ID value is owned by the second storage system.

17. The system as defined in claim 16 further comprising a LUN map table configured to list all LUNs mapped by the first and second storage systems.

18. The system as defined in claim 16 wherein a decision to forward the data access request is made within the cluster and without the client.

19. The system as defined in claim 15 further comprising a first reserved space from which a first set of LUNs owned locally by the first storage system are assigned a first set of LUN ID values, and a second reserved space from which a second set of LUNs owned locally by the second storage system are assigned a second set of LUN ID values.

20. The system as defined in claim 15 wherein each storage system in the cluster is configured to access a LUN map of a partner storage system, and wherein each storage system is further configured to operate in a failover mode to process data access requests for locally owned LUNs and LUNs owned by the partner storage system.

21. The system as defined in claim 15 further comprising a LUN configuration check program for execution at the cluster.

22. The system as defined in claim 21 wherein the LUN configuration check comprises program instructions that ensure a new LUN is not mapped in a reserved range of a LUN space.

23. The system as defined in claim 15 wherein the single node identifier comprises a serial number.

24. A computer readable storage medium containing executable program instructions executed by a processor, comprising:
- program instructions that couple a plurality of storage systems in a cluster over a network;
- program instructions that apply a single node identifier to each storage system in the cluster, wherein the cluster appears to a client operatively connected to the cluster as a single storage system;
- program instructions that receive a request at a first storage system of the plurality of storage systems in the cluster from the client using the single node identifier for data stored on a storage device operatively connected to the cluster; and
- program instructions that service the request at the first storage system in response to receiving the request.

* * * * *